United States Patent [19]
Gerritsen et al.

[11] Patent Number: 6,003,072
[45] Date of Patent: Dec. 14, 1999

[54] MULTI-MEDIA DATA PROCESSING DEVICE WITH REMOTE CONTROL DEVICE THAT ALSO HAS VOICE INPUT MEANS AND HAND-SIZED UNIT FOR USE IN SUCH DATA PROCESSING DEVICE

[75] Inventors: Frans A. Gerritsen, Eindhoven, Netherlands; Manfred Hörndl, Horn, Austria

[73] Assignee: U.S. Philips Corporation, New York, N.Y.

[21] Appl. No.: 08/269,818

[22] Filed: Jun. 30, 1994

[30] Foreign Application Priority Data

Jul. 1, 1993 [EP] European Pat. Off. .............. 93201909

[51] Int. Cl.[6] .................................................... G06F 15/46
[52] U.S. Cl. ...................... 709/218; 340/825.72; 341/176
[58] Field of Search ........................ 340/825.72, 825.69; 341/176; 364/400; 395/200.09, 2; 178/31; 709/218, 238

[56] References Cited

U.S. PATENT DOCUMENTS

| 4,461,013 | 7/1984 | Lese et al. ................................ 375/65 |
| 4,931,950 | 6/1990 | Isle et al. .................................. 395/11 |
| 5,086,385 | 2/1992 | Launey et al. .......................... 364/188 |
| 5,283,819 | 2/1994 | Glick et al. ............................... 379/90 |
| 5,335,276 | 8/1994 | Thompson et al. ...................... 380/21 |
| 5,335,313 | 8/1994 | Douglas ................................ 395/2.84 |
| 5,408,582 | 4/1995 | Colier .................................... 395/2.52 |
| 5,469,192 | 11/1995 | Allen et al. ............................ 345/157 |
| 5,500,936 | 3/1996 | Allen et al. ............................ 395/156 |

FOREIGN PATENT DOCUMENTS

| 0402911 | 12/1990 | European Pat. Off. . |
| 0538794 | 4/1993 | European Pat. Off. .......... G06F 3/16 |

*Primary Examiner*—Larry D. Donaghue
*Attorney, Agent, or Firm*—Dwight H. Renfrew

[57] ABSTRACT

A multi-media data processing device has a visual display, storage, and a user interface with voice input and a manually actuatable remote control. In particular, the remote control and the voice input device are physically integrated to a hand-sized unit. Combining discrete manipulatory control signals and voice input signals allows to select and annotate transiently displayed pictures. Advantageously, the hand-sized unit is wireless.

13 Claims, 3 Drawing Sheets

MULTI-MEDIA DATA PROCESSING DEVICE WITH REMOTE CONTROL DEVICE THAT ALSO HAS VOICE INPUT MEANS AND HAND-SIZED UNIT FOR USE IN SUCH DATA PROCESSING DEVICE

BACKGROUND OF THE INVENTION

The invention relates to a multi-media data processing device having visual display means, storage means, user interface means including voice input means and manually actuatable remote control means. Multi media implies a selected combination among character-based text, film material, graphics, graphs, photographs, audio sequences, and possibly other elements that are suitable for producing human sensory experience. Those elements are in some way stored in storage of appropriate type, such as electrically, optically, or magnetically, and may be selectively accessed for temporary or transient display. Various fields of application have seen the need for audio annotation, and also for remote control according what is colloquially called the zap! mechanism. A particular field is the viewing of medical pictures produced by technology such as nuclear magnetic resonance, computer tomography, infrared scanning, dynamic physiological cinema, and various others. However, many other fields of use would see similar interactivity features. A relevant publication is EP 402,911, corresponding Japanese Patent Application No. 149,628/89, priority 890614 to Hitachi, Ltd, herein incorporated by reference. Now, the combination of remote control means and audio inputting means puts appreciable inconvenience on the human user, in particular, when the two mechanisms are used in frequent alternation, because one hand of the operator is needed to hold the remote control unit, whereas it is also necessary to keep his head close to the microphone and vice versa: if the microphone is in a fixed position, this would detract from the remote control ergonomy, whereas, if the microphone is hand-held, this will occupies the second hand of the operator as well. By itself, it is known to have necklace and buttonhole-worn microphones, but the provision of a second, physically separate peripheral device causes much confusion and inconvenience.

SUMMARY TO THE INVENTION

Accordingly, amongst other things it is an object of the present invention to provide a physical realization of such double interactivity means as recited above, that keeps the interactivity field to the user as unobstructed as possible, and to also improve the operability features thereof from an ergonomical point of view. According to one of its aspects, the invention is characterized in that said remote control means and said voice input means are physically integrated into a hand-sized unit for through combining discrete manipulatory control signals and voice input signals effecting selecting and annotating transiently displayed pictures in said storage means. For one, if the unit is hand-sized, it may be manipulated by a only one hand of the operating person. And even if it is positioned temporarily or in permanence, in a fixed way with respect to the remainder of the system, such as the visual display device, its small size would lead to only little encumbrance.

Advantageously, the hand-sized unit is wireless. This allows the operating person a particular freedom to move around. However, a wired unit in many environments would be useful as well.

Advantageously, the device allows voice-input commands through said hand-sized unit. This further broadens the scope of interactivity mechanisms.

Advantageously, the device allows with respect to the encapsulation of said hand-sized unit physical application of a smart card member.

The invention also relates to a hand-sized and manually actuatable remote control unit for use in such multi-media data processing device. In particular, the invention relates to a hand-sized and manually activatable remote control unit for use with a speech processing device having display means, storage means processing means, and said control unit having voice input means, and interfacing means for transferring voice signal representations and command signals to said speech processing device, characterized in that said unit has discrete manipulatory control means for allowing selecting and accessing displayed information on said display means, for so allowing transmission of command signals for effecting selecting, annotating and processing of stored voice information in said storage means. The overall system may have visual or audio information as its principal medium. If visual, the audio may be used to supplement explanatory or identificatory information. If the mainstay is audio the video display may provide various supporting information, such as a table of contents (TOC), audio intensity, duration of various text sections. These now can be cursored and accessed: audio intensity can be preprocessed; such as when a weak passage is automatically amplified when reproduced, as relative to other, louder passages. Sections may be suppressed. Sections may be logically joined to other sections that are physically non contiguous. Various other manipulations are by themselves known. Various advantageous aspects are recited in dependent Claims.

BRIEF DESCRIPTION OF THE DRAWING

These and other aspects of the invention will become apparent with reference to the disclosure of preferred embodiments that are shown in particular in and by the appended Figures as follows.

DETAILED DESCRIPTION OF A PREFERRED EMBODIMENT

Figure 1:
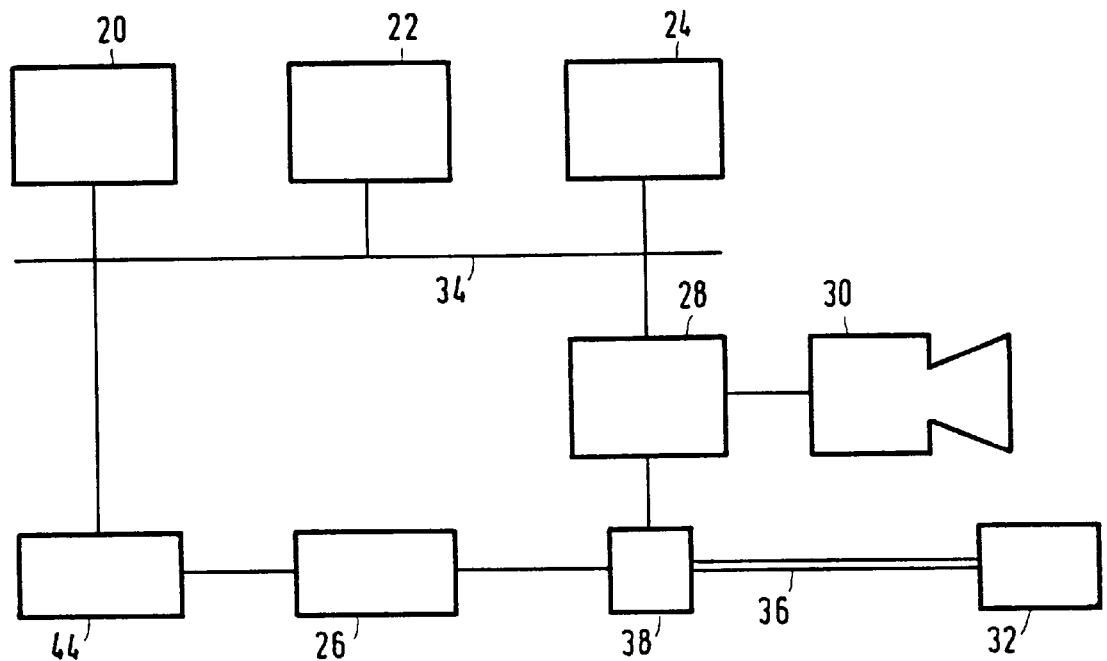
FIG. 1 shows a device according to the invention.

FIG. 1 shows a block diagram of a device according to the invention, in the form of a comprehensive data processing device or system. By itself, the size or performance on a MIPS or Gigabyte characterization level is irrelevant. Block 20 is an information processing unit. Block 22 is an information processing storage unit with an appropriate degree of random addressability. Block 24 is a filing or background storage unit that may be based on serial storage, such a CD-ROM or magnetic disk technology, or just may be a remote data base. Item 34 is a bus of appropriate transfer capability that interconnects various other units as shown. For brevity, the bus protocol systems has not been discussed in detail, inasmuch as it could be a standard bus. Block 30 is a display unit that displays a visual frame. Block 28 is a multiwindow display processing unit, which in combination with display unit 30 forms what is colloquially termed a "workstation". The work station may have various other peripherals, such as standard keyboard, hard copy means, etcetera. Block 32 is a hand-sized unit according to the invention, and which is shown more in detail with reference to FIG. 2. The unit takes up voice messages as well as manipulatory control signals, as will be explained hereinafter, and converts these to signals on infra-red or radio-wave based link 36. Block 38 is a separator device and distinguishes between voice input signals and manipulatory produced control signals. Block 26 is a voice analyzer unit that is used for digitizing received speech, recognizing whether a voice signal corresponds to an element of a limited set of commands or free-style voice input. Block 44 is a bus interface processor that formats received speech into appropriate messages, and transmits all such messages to appropriate destination stations: commands to the display or to processor 20, voice input to the processor or to storage 22. All connections shown may be either simplex, half duplex, or duplex, according to necessity and the skilled choosing of a designer.

Figure 2:
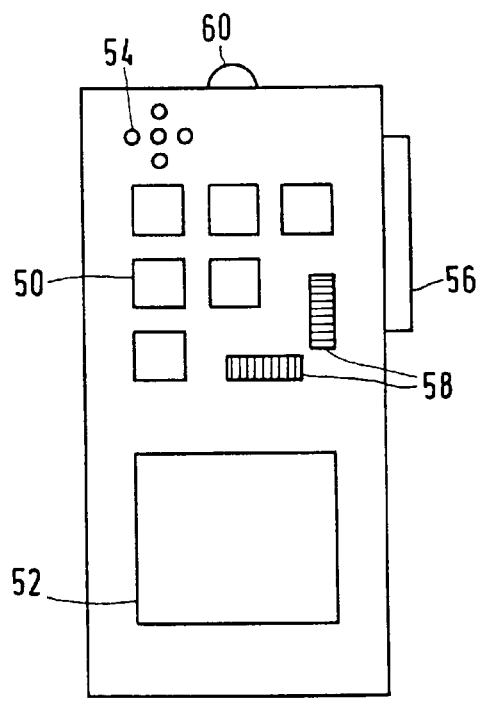
FIG. 2 shows a hand-sized unit according to the invention.

FIG. 2 shows a hand-sized unit according to the invention. Although shown as a block of about 12×5×2 centimetres, with a weight of about 150 grams, these dimensional features could be subject to change: a factor of about 2 in either dimension could be feasible, while the weight could even be much less, all this dependent on various inherent functions. The shape of the unit could be adapted to the shape of a human hand. The unit could be provided with fixing means for being fixed to the display system, such as in a reload device. In the order of decreasing relevance or priority, the input elements are the following:

function keys 50 shown as squares may have functions like -previous-, -next-, -step enlarge-, -step decrease- (for zooming), -voice input on-, -voice input off-, and many others. Additionally, a hexadecimal keyboard, or even a miniature complete or incomplete alpha-numerical keyboard could be provided.

pressure-sensitive graphics tablet 52 that is sensitive to thumb, pen, or both, may be used for mouse-wise control because pointing is often easier than using previous or next keys. Another feature would be graphical highlighting of a picture, such as by entering an arrow, or other sign.

microphone 54, as shown by a set of openings in the housing to provide for transmission of the speech pressure waves for entering commands and or dicta-phone information; from the outside of the housing, the microphone is not visible. The commands need to be recognized in some way that has been described for audio command input in general, whereas the dicta-phone information may be analog as well as digital, the latter of course allowing improved functionality with respect to storage facilities and later retrieval.

berth means 56 for physically entering a chip card allow for ID validation of the operator person, with respect to access rights or authentication. In fact certain persons that "own" a particular data base could be allowed to modify, whereas certain others would only be allowed to read the data. Another feature of such chip card would be personalization of functionality. The usage of a PIN-like key could be envisioned. Especially for a medical environment, the usage of a chip card may allow to enter dated signatures to a particular stored data entity, such as for insurance use. For brevity, the chip card operation is not discussed further.

endless spin wheels in either or both coordinate axis directions could be used for various tasks, such as cursor moving, magnification change or level setting.

infra-red LED transmitter is used for transmitting both user interface command signals and voice input. In an extended set-up the transmission could be two sided. On the other hand, a tethered solution or an embodiment with AM or FM radio waves could be feasible as well.

Figure 3:
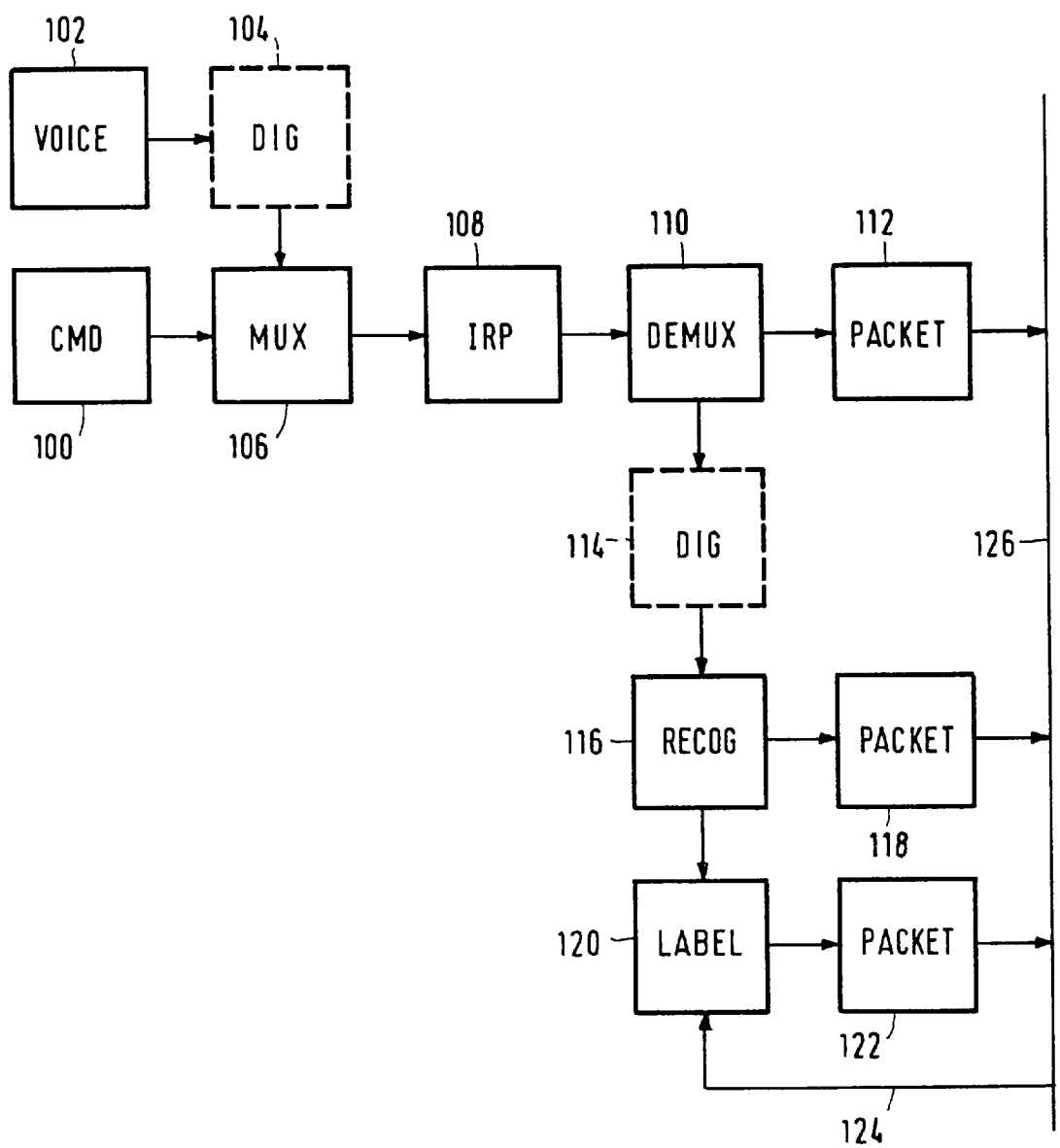
FIG. 3 shows an organization chart of the interactivity.

FIG. 3 shows an organization chart of the interactivity. Blocks 100–108 relate in particular to the hand-sized unit. Block 100 represents the manipulatory input commands. Block 102 represents the voice input. Block 104 represents the voice digitizing within the hand-sized unit. Block 106 represents a multiplexer that may include means for prioritizing among voice and manipulatory commands. For example, actuation of either one of these would block transmission of the other for a particular short period, and as long as the former actuation continues. The means thereto could be a voice loudness level detector and a key actuation detector, not shown for brevity. Block 108 represents the infrared path which in this embodiment only transfers digital signals. Block 110 represents a demultiplexer that forwards command signals to block 112, and the voice input signals to block 114. Block 112 formats the commands by means of adding a header signal that comprises a bus address and other actions that are privy to the bus protocol in question. Block 114 as an alternative to block 104 represents the voice digitizing outside the hand-sized unit. If the infra-red voice transfer is analog, the loudness level detector signal is also transmitted and may directly control the demultiplexing in block 110. Block 116 represents a recognition process. This may on the one hand, recognize a limited set of voice-inputted commands. The recognized command is forwarded to block 118 that largely corresponds to block 112. On the other hand, block 116 may represent full speech recognition, thereby allowing storage within very small capacity. The speech so recognized is forwarded to block 120. Now, if the audio text is long, this may cause a necessity for limiting the transfer to relatively limited-length packages that constitute a logical chain. Thereto in block 120 such packages are labelled with the indication of the picture that is presently displayed on the display device 30 in FIG. 2 or with an indication of the subpicture pointed at by some cursoring therein. Next, the information is forwarded to block 122 that substantially corresponds to block 112. In fact, the shown functional distinction between blocks 112, 118, need imply no physical distributivity. Arrow 124 shows the path for providing block 120 with the labelling information. Element 126 represents the bus proper.

Figure 4:
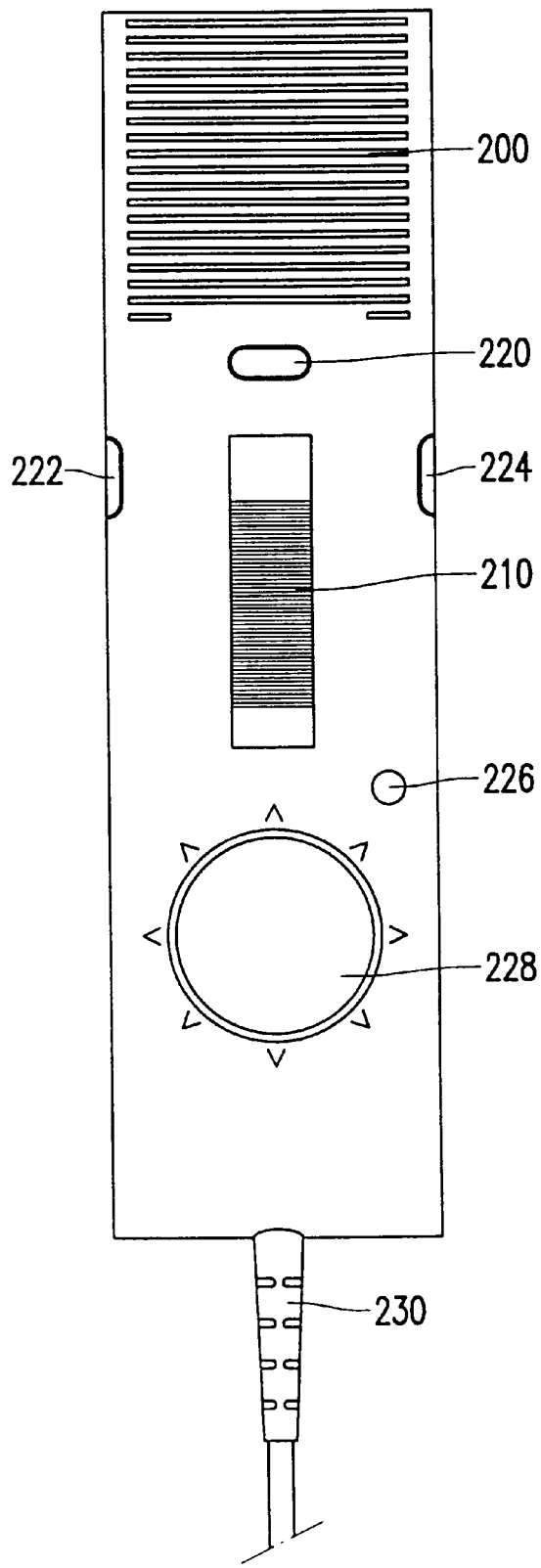
FIG. 4 shows a second hand-sized unit according to the invention.

FIG. 4 shows a second hand-sized unit according to the invention. The unit has standard elements as microphone 200, central control button 210 for effecting fast forward, play, stop, fast backward, secondary control buttons 220, 222, 224 for effecting recording, marking, and searching, and cable 230 for interconnection to the central station that has storage, display, and processing. The cable transports both control and audio signals.

For selectively accessing the display, the hand-sized unit has cursor driver 228, which in this case has been executed as a so called tracker ball. Rotation in any direction controls an associated motion of the on-screen cursor. Pressing button 226 will activate a cursored item. By itself, cursor-controlled interaction is well-known in the art.

We claim:

1. A multimedia data processing device for displaying stored images, capturing voice annotations associated with the images, and allowing user input through a hand sized device, comprising:

storage memory for storing the images and the associated digitized voice annotations;

a display coupled to the storage memory to permit high speed transient display of the images stored in the storage memory;

a local controller coupled to the storage memory;

a remote controller connected to the local controller having discrete manipulatory controls for receiving discrete manipulatory control signals and a voice transducer for receiving voice input signals and means for transmitting the control signals and voice signals to the local controller for selecting and annotating the transiently displayed images.

2. A device as claimed in claim 1, wherein said hand-sized unit is wireless.

3. A device as claimed in claim 1, wherein said control signals are single-stroke-actuation generated.

4. A device as claimed in claim 1, and allowing voice-input commands through said hand-sized unit.

5. A device as claimed in claim 1, and allowing with respect to the encapsulation of said hand-sized unit physical application of a chip card member.

6. A hand-sized and manually activatable remote control unit for selecting and annotating images in a multimedia data processing device having a memory storage for storing images and digitized voice annotations, a display for displaying the images, and an information processor comprising;

discrete manipulatory controls for selecting and accessing stored images on the display;

a voice transducer physically integrated to the unit for producing voice signals for annotating the stored images; and a short range interface connected to the controls and the voice transducer for converting outputs from the controls to discrete manipulatory control signals, for combining the discrete manipulatory control signals with voice input signals to form command signals and for transferring the command signals to the multimedia data processing device for selecting, annotating and processing transiently displayed images in said memory storage.

7. A hand-sized unit as claimed in claim 6, wherein said unit is wireless.

8. A hand-sized unit as claimed in claim 6, and allowing voice-input commands.

9. A hand-sized unit as claimed in claim 6, and allowing with respect to its encapsulation physical application of a chip card member.

10. A hand-sized and manually activatable remote control unit for a speech processing device having a memory storage for storing voice signals, and voice annotations, and a visual display for displaying images representing the voice signals, comprising;

discrete manipulatory controls on the remote control unit for selecting and accessing the images representing voice information on the display of the speech processing device;

a voice transducer for producing voice annotation signals; and a short range interface connected to the controls and the voice transducer for converting outputs from the transducer and the controls to voice signal representations and command signals and transferring voice signal representations and the command signals to the speech processing device for selecting, annotating and processing stored voice information in said memory storage.

11. A hand-sized unit as claimed in claim 10, wherein said unit is wireless.

12. A hand-sized unit as claimed in claim 10, and allowing voice-input commands.

13. A hand-sized unit as claimed in claim 10, and allowing with respect to its encapsulation physical application of a chip card member.

* * * * *